(12) United States Patent
Cutler

(10) Patent No.: US 7,091,707 B2
(45) Date of Patent: Aug. 15, 2006

(54) METHOD AND APPARATUS FOR CONTROLLING POWER DRAWN FROM AN ENERGY CONVERTER

(75) Inventor: Henry H. Cutler, Palm Harbor, FL (US)

(73) Assignee: Xantrex Technology, Inc., Arlington, WA (US)

( * ) Notice: Subject to any disclaimer, the term of this patent is extended or adjusted under 35 U.S.C. 154(b) by 153 days.

(21) Appl. No.: 10/672,075

(22) Filed: Sep. 29, 2003

(65) Prior Publication Data

(51) Int. Cl.
G05F 1/40 (2006.01)
G05F 5/00 (2006.01)
H02J 3/00 (2006.01)

(52) U.S. Cl. ...................... 323/268; 323/299

(58) Field of Classification Search ................ 323/265, 323/268, 271, 273, 275, 282, 284, 285, 299, 323/303; 363/34, 37
See application file for complete search history.

(56) References Cited

U.S. PATENT DOCUMENTS

| | | | |
|---|---|---|---|
| 3,795,858 A * | 3/1974 | Fletcher et al. ............. 324/511 |
| 4,404,472 A | 9/1983 | Steigerwald | |
| 5,917,711 A * | 6/1999 | Shikata et al. ................ 363/16 |
| 5,932,938 A * | 8/1999 | Shimamori ................ 307/125 |
| 6,111,391 A | 8/2000 | Cullen | |
| 6,204,645 B1 | 3/2001 | Cullen | |
| 6,255,804 B1 | 7/2001 | Herniter et al. | |
| 6,690,590 B1 * | 2/2004 | Stamenic et al. ............. 363/89 |
| 6,882,131 B1 * | 4/2005 | Takada et al. .............. 323/282 |
| 6,917,185 B1 * | 7/2005 | Okamoto ..................... 323/241 |

OTHER PUBLICATIONS

Knopf, H., "Analysis, Simulation, and Evaluation of Maximum Power Point Tracking (MPPT) Methods for a Solar Powered Vehicle," Thesis, Portland State University, 1999.
Cutler, H., and Thorne, T., "Implementation and Testing of the Upgraded Suntie XR-Version 5.0 Used in Single Photovoltaic Systems," *STXR-V5 White Paper*, Revision A, Apr. 8, 2003, 7 pages.
Sun, X., et al., "A Research on Photovoltaic Energy Controlling System With Maximum Power Point Tracking," *IEEE*, 2002, pp. 822-826.
Cutler, H., and Thome, T., "Implementation and Testing of the Upgraded Suntie XR-Version 5.0 Used in Single Photovoltaic Systems," *STXR-V5 White Paper*, Revision A, Apr. 8, 2003, 7 pages.

* cited by examiner

*Primary Examiner*—Matthew V. Nguyen
(74) *Attorney, Agent, or Firm*—Christensen O'Connor Johnson Kindness PLLC

(57) ABSTRACT

Methods, apparatus, media and signals for controlling power drawn from an energy converter to supply a load, where the energy converter is operable to convert energy from a physical source into electrical energy. Power drawn from the energy converter is changed when a supply voltage of the energy converter meets a criterion. The criterion and the change in the amount of power drawn from the energy converter are dependent upon a present amount of power supplied to the load. The methods, apparatus, media and signals described herein may provide improvements to DC to AC maximum power point tracking in an energy conversion system such as a photovoltaic power generation system.

30 Claims, 12 Drawing Sheets

TABLE B

| ACP | $DCoff_i$ | $MPPT\_INC_i$ | $BACKoff_i$ |
|---|---|---|---|
| $1024 < ACP \leq P_{MAX}$ | 0.25 | 0.25 | 240 |
| $512 < ACP \leq 1024$ | 0.5 | 0.5 | 480 |
| $256 < ACP \leq 512$ | 1.0 | 1.0 | 480 |
| $128 < ACP \leq 256$ | 1.5 | 1.0 | 480 |
| $96 < ACP \leq 128$ | 2.0 | 1.0 | 480 |
| $0 < ACP \leq 96$ | 4.0 | 1.0 | 480 |

128　　126　　134　　138

TABLE C

| AC POWER | MPPT_LIMIT |
|---|---|
| 1024 ≤ AC POWER | 0.25 |
| 512 ≤ AC POWER < 1024 | 0.5 |
| 0 ≤ AC POWER < 512 | 1.0 |

FIG. 11B

METHOD AND APPARATUS FOR CONTROLLING POWER DRAWN FROM AN ENERGY CONVERTER

BACKGROUND OF THE INVENTION

1. Field of Invention

This invention relates to energy conversion and more particularly to methods and apparatus for controlling power drawn from an energy converter operable to convert energy from a physical source into electrical energy.

2. Description of Related Art

Energy conversion devices such as photovoltaic arrays are commonly used to provide power to electrical loads. Often these loads are direct current (DC) loads such as batteries, for example. Recently, efficiencies in power conversion devices are giving rise to solar power systems that supply power to an alternating current (AC) load such as an AC power grid such as may be operated by a public utility company. Such power systems may employ a photovoltaic array and an interface for converting power in a form received from the photovoltaic array into a form operable to be received by the AC power grid. Such an interface may involve a DC to AC inverter.

Interfaces of the type described above often seek to cause maximum power to be provided to the AC power grid. The maximum power available to be provided to the AC power grid depends upon the conditions under which the energy conversion device is operated and in the case of a photovoltaic array, these conditions include the amount of insolation and the temperature of the array, for example. A maximum power point, or voltage at which maximum power may be extracted from the array, is a desirable point at which to operate the array and conventional systems seek to find this point. The maximum power point changes however, due to changes in insolation and due to changes in temperature of the array and thus control systems are employed to constantly seek this point.

One way of seeking the maximum power point is to periodically perturb and observe the power output of the array and then adjust the power demanded from the array accordingly to cause the voltage of the array to be as close as possible to the maximum power point. Typically, such perturb and observe methodologies involve perturbing the present power supplied to the load by a fixed amount such as 4 watts, for example and then observing the effect on power supplied by the array and the voltage measured at the array. Perturbing involves temporarily increasing the power supplied to the load by a fixed amount such as 4 watts, for example. If the change in power is negative and voltage measured at the array drops by a significant amount, too much power is being extracted from the array and the power demand on the array must be reduced, in which case the power supplied by the array is usually reduced by some fixed incremental value, such as 4 watts, for example. If the voltage does not change by a significant amount when the power is perturbed, perhaps not enough power is being extracted from the array and the present power drawn from the array must be increased in which case the power demanded from the array is usually increased by a fixed amount, such as 4 watts.

The above described perturb and observe methodology is typically conducted at the switching speed of a switching mode power supply connected to the array, e.g., 100 kHz, and results in a dithering of power drawn from the array, in fixed amounts. Where the incremental amount is 4 watts for example, as described above, there will be a constant dithering of power demanded from the array, in the amount of 4 watts about a common mode value which may be approximately equal to the maximum power output of the array. When the load is an AC power grid, the load effectively fluctuates at the line frequency of the grid, which in North America is typically 60 Hz. Consequently, the 100 kHz perturb and observe frequency of most switching mode power supplies used to supply DC loads is too fast for applications where the load is an AC power grid. Thus, the perturb and observe frequency must be decreased.

However, decreasing the perturb and observe frequency can waste power, especially when changes in insolation occur.

Changes in insolation can change the maximum power available from the array from say 200 watts to 2000 watts in a matter of seconds. This situation may occur when a cloud, for example, moves or dissipates from a position blocking sunlight shining on the array to a position in which full sun is received on the array. With 4 watt power increments, and a perturb and observe period of 50 mSec, the time to change the power drawn from the array from 200 watts to 2000 watts would be about 22 seconds. During this period the full available power is not being drawn from the array resulting in inefficient operation.

SUMMARY OF THE INVENTION

In accordance with one aspect of the invention there is provided a method of controlling power drawn from an energy converter to supply a load, where the energy converter is operable to convert energy from a physical source into electrical energy. The method involves changing the amount of power drawn from the energy converter when a supply voltage of the energy converter meets a criterion, said criterion and a change in the amount of power drawn from the energy converter being dependent upon a present amount of power supplied to the load.

The method may involve measuring the supply voltage.

Changing the power drawn from the energy converter may include decreasing the power drawn from the energy converter by an amount corresponding to a change in the power supplied to the load in a time interval, or it may include increasing the power drawn from the energy converter by an amount associated with a range of power supplied to the load.

The method may involve deeming the supply voltage satisfies the criterion when the supply voltage is within a first range of voltages relative to a reference voltage. The reference voltage may correspond to a maximum power point of the energy conversion device. The first range may include voltages greater than the reference voltage, or the first range may include voltages less than the reference voltage. Alternatively, the first range may include voltages less than the reference voltage and voltages greater than the reference voltage. The first range may exclude a range of voltages within a limit of the reference voltage, and the first range may be dependent upon a trend in measured voltage. The first range may be dependent upon a change in voltage occurring after an increase in power. Moreover, the first range may be bounded between minimum and maximum limits.

The method may further involve performing the method periodically, and defining a period for performing the method periodically. Defining the period may include defining the period as a function of the power supplied to the load. The method may involve increasing the period when the power supplied to the load is relatively low and decreasing the period when the power supplied to the load is relatively high.

The method may further involve adjusting the reference voltage periodically, or may involve increasing the reference voltage when a change in power drawn from the energy converter results in a change in supply voltage within a second range. The second range may be dependent upon the amount of power being supplied to the load. The second range may be relatively small when a relatively large amount of power is supplied to the load and the second range may be relatively large when a relatively small amount of power is supplied to the load. The amount by which the reference voltage is decreased may be dependent upon the amount of power supplied to the load. The amount by which the reference voltage is decreased may be relatively large when the amount of power supplied to the load is relatively low and the amount by which the reference voltage is decreased may be relatively low when the amount of power supplied to the load is relatively high.

In accordance with another aspect of the invention there is provided an apparatus for controlling an energy transfer device operable to draw electrical energy from an energy converter operable to convert energy from a physical source into electrical energy and supply the electrical energy to a load. The apparatus includes a load power sensor operable to measure power supplied to the load by the energy transfer device, a voltage sensor operable to measure a supply voltage the energy converter, and a processor, in communication with the voltage sensor, the load power sensor and the energy transfer device. The processor is configured to cause the energy transfer device to change the amount of power drawn from the energy converter when the supply voltage of the energy converter meets a criterion, wherein said criterion and the change in power drawn from the energy converter is dependent upon a present amount of power being supplied to the load.

The processor may be configured to decrease the power drawn from the energy converter by an amount corresponding to a change in the power supplied to the load in a time interval. Alternatively, the processor may be configured to increase the power drawn from the energy converter by an amount associated with a range of power supplied to the load.

The processor may be configured to deem that the supply voltage satisfies the criterion when the supply voltage is within a first range of voltages relative to a reference voltage. The reference voltage may correspond to a maximum power point of the energy conversion device.

The first range may include voltages greater than the reference voltage, it may includes voltages less than the reference voltage, or it may include voltages less than the reference voltage and voltages greater than the reference voltage. The first range may exclude a range of voltages within a limit of the reference voltage, and may be dependent upon a trend in measured voltage. The first range may further be dependent upon a change in voltage occurring after an increase in power, and may be bounded between minimum and maximum limits.

The processor may be configured to periodically measure the supply voltage and change the power drawn from the energy converter accordingly, and may be further configured to define a period for measuring the supply voltage, and the period may be defined as a function of the power supplied to the load. The processor may be configured to increase the period when the power supplied to the load is relatively low and decrease the period when the power supplied to the load is relatively high.

The processor may be configured to adjust the reference voltage periodically. The processor may be configured to increase the reference voltage when an increase in power drawn from the energy converter results in a change in supply voltage within a second range. The second range may be dependent upon the amount of power being drawn from the energy converter. The second range may be relatively small when relatively large amounts of power are being supplied to the load and the second range may be relatively large when relatively small amounts of power are being supplied to the load. The processor may be further configured to decrease the reference voltage by an amount dependent upon the amount of power supplied to the load. In particular, the processor may be configured to decrease the reference voltage by a relatively large amount when the power supplied to the load is relatively low and to decrease the reference voltage by a relatively small amount when the power supplied to the load is relatively high. The apparatus may include an output operable to provide a power command signal to the energy transfer device, and the processor may be configured to produce the power command signal to represent the change in power to be drawn from the energy converter.

In accordance with another aspect of the invention there is provided a system including the foregoing apparatus and further including the energy transfer device. The energy transfer device may include a DC to DC converter connected between the energy converter and the load, and may also include a DC to AC inverter connected between the DC to DC converter and the load. The system may further include the load, and the load may include an AC power grid. The processor may include an output operable to provide a power command signal to the energy transfer device, and the processor may be configured to produce the power command signal to represent the change in power to be drawn from the energy conversion device.

In accordance with another aspect of the invention there is provided an apparatus for controlling an energy transfer device operable to draw electrical power from an energy converter operable to convert energy from a physical source into electrical energy, and supply the electrical energy to a load. The apparatus includes provisions for measuring power supplied to the load by the power transfer device, provisions for measuring a supply voltage of the energy converter, and provisions, in communication with the provisions for measuring power, the provisions for measuring voltage and the energy transfer device, for changing the amount of power drawn from the energy converter by the energy transfer device when a supply voltage of the energy converter meets a criterion, wherein said criterion and a change in the amount of power drawn from the energy converter are dependent upon a present amount of power being supplied to the load.

In accordance with another aspect of the invention there is provided a computer readable medium encoded with codes for directing a processor circuit to control an energy transfer device operable to draw power from an energy converter operable to convert energy from a physical source into electrical energy, and supply the energy to a load, the codes directing the processor circuit to cause the energy transfer device to change the amount of power drawn from the energy converter when a supply voltage of the energy converter meets a criterion, said criterion and a change in the amount of power drawn from the energy converter is dependent upon a present amount of power supplied to the load.

In accordance with another aspect of the invention there is provided a computer readable signal encoded with codes for directing a processor circuit to control an energy transfer device operable to draw power from an energy converter operable to convert energy from a physical source into electrical energy, and supply the energy to a load, the codes directing the processor circuit to cause the energy transfer device to change the amount of power drawn from the energy converter when a supply voltage of the energy converter meets a criterion, said criterion and a change in the amount of power drawn from the energy converter being dependent upon a present amount of power supplied to the load.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 11B is a Table relating current AC power to an MPPT limit used by the find MPPT subroutine shown in FIG. 11A.

DETAILED DESCRIPTION

Figure 1:
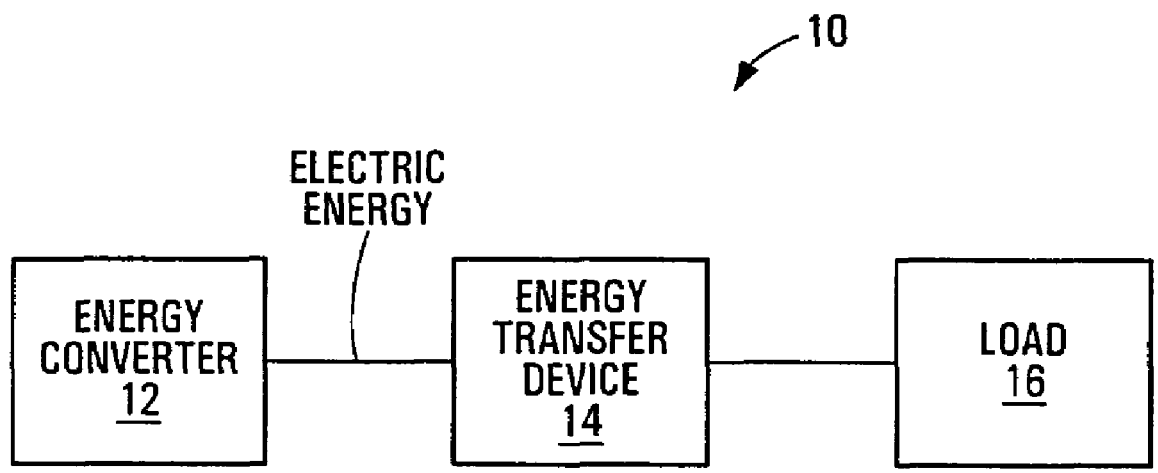
FIG. 1 is a block diagram of an energy conversion system according to a first embodiment of the invention.

Referring to FIG. 1 an energy supply system according to a first embodiment of the invention is shown generally at 10. The system includes an energy converter 12 and an energy transfer device 14 which together cooperate to supply energy to a load 16.

The energy converter 12 is of a general class of energy conversion devices that are able to supply electrical power in response to a supply of physical energy. Such devices are able to be operated under conditions where the supply voltage and supply current produced by the device are optimized such that for a given physical power input a maximum electrical power, i.e. a maximum working power is produced. The supply current and supply voltage conditions under which maximum working power can be extracted from the energy conversion device change depending upon the physical power available and operating conditions of the device.

For example, the energy converter 12 may include a photovoltaic array and the energy transfer device 14 may include a DC to AC converter for supplying electrical energy to an AC load such as an AC power grid.

Where the energy converter 12 includes a photovoltaic array, physical energy in the form of light energy is converted by the photovoltaic array into electrical energy. The maximum working power that can be drawn from the photovoltaic array depends upon the physical power available, i.e. the amount of light insolating the array and the temperature of the array. For every insolation and temperature combination there is a maximum power point at which the supply voltage and supply current produced by the array are optimized to cause maximum energy conversion efficiency, or in other words to allow the most working power possible to be drawn from the array.

Figure 2:
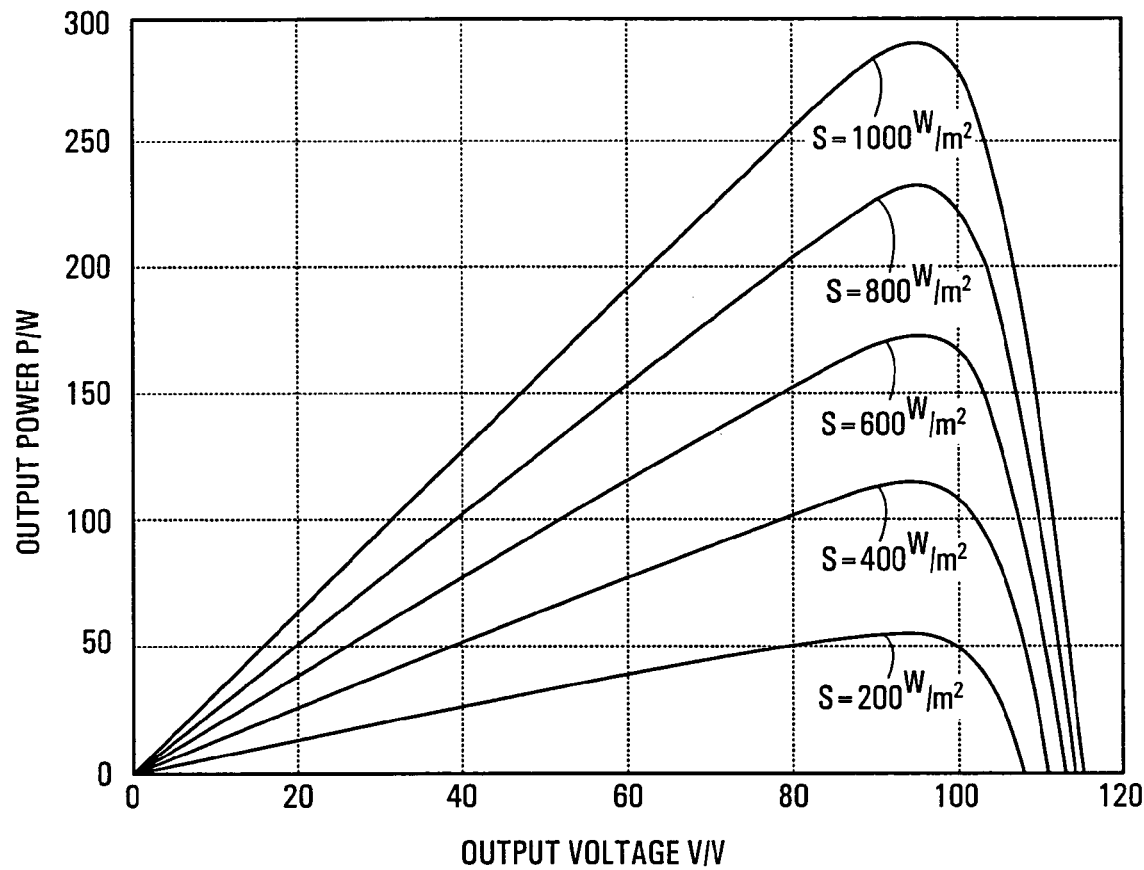
FIG. 2 is a graph of power-voltage characteristics of a photovoltaic cell array for various values of insolation S at a temperature of 25 degrees Celsius.

Changes in voltage at the array are effected by changes in the amount of current drawn from the array. In general, the greater the current draw, the less the voltage. Since the power drawn from the array may be calculated as the product of the current and voltage at the array, the power output of the array may be plotted relative to voltage as shown in FIG. 2, for various levels of insolation. From FIG. 2 it can be seen that the power output of the photovoltaic array increases to a point and then decreases with increasing array voltage. The point at which the power is the greatest is the maximum power point. The embodiment described herein seeks to find this maximum power point and regulate the output voltage of the array to it.

In the embodiment shown, referring back to FIG. 1, in accordance with one aspect of the invention, the energy transfer device 14 controls the power drawn from the energy converter 12 by measuring a supply voltage of the energy converter and when the measured supply voltage satisfies a first criterion dependent upon the power supplied to the load, the amount of power drawn from the energy converter is, in one mode of operation, changed by an amount dependent upon the amount of power being supplied to the load 16. Changing the amount of power being drawn from the energy converter may involve decreasing the power by an amount corresponding to a change in the power supplied to the load during a time interval or increasing the source power by an amount associated with a range of output power.

Figure 3:
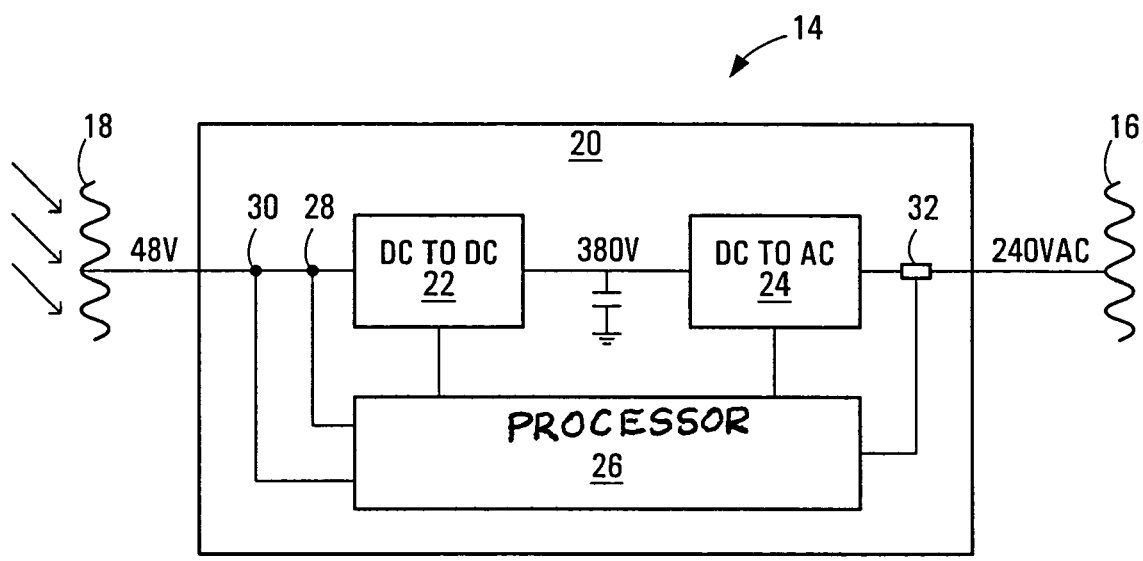
FIG. 3 is a block diagram of an energy transfer device according to an embodiment of the invention.

Referring to FIG. 3, to appreciate how the energy transfer device 14 can produce this effect, the following example is provided in which the energy converter 12 is a photovoltaic array 18 and the energy transfer device 14 includes a Xantrex Suntie® utility grid interactive inverter 20. The inverter 20 employs two conversion stages including a DC to DC converter 22 operable to convert input power from the array 18 at a nominal supply voltage of 48 volts to stored power at a voltage of about 380 volts. This converter is a closed loop device and is operable to provide power at a constant DC voltage of 380 volts. The inverter 20 further includes a DC to AC inverter 24 operable to convert the stored power at 380V into AC power at 240 RMS volts. The load 16 is an AC power grid operated by a public utility company, for example.

The power inverter 20 has a processor 26 operable to control the DC to DC converter 22 and DC to AC inverter 24 to change the amount of working power drawn from the array 18 to correspondingly change the amount of working power supplied to the AC load 16. To do this the inverter 20 includes a DC current sensor 28 for sensing the current supplied by the array 18, a DC voltage sensor 30 for sensing the supply voltage at the array 18, and an AC power sensor 32 for sensing AC power supplied to the AC load 16. These sensors 28, 30 and 32 are in communication with the processor 26 and the controller is able to read and interpret signals therefrom as array current (1k), array voltage (Vk) and AC power (ACP) respectively. The sensors 28, 30, and 32 may respectively provide a current measurement resolution of about 62.5 mA, a voltage resolution of about 0.125V, and an AC power resolution of about 1W, for example.

Figure 4:
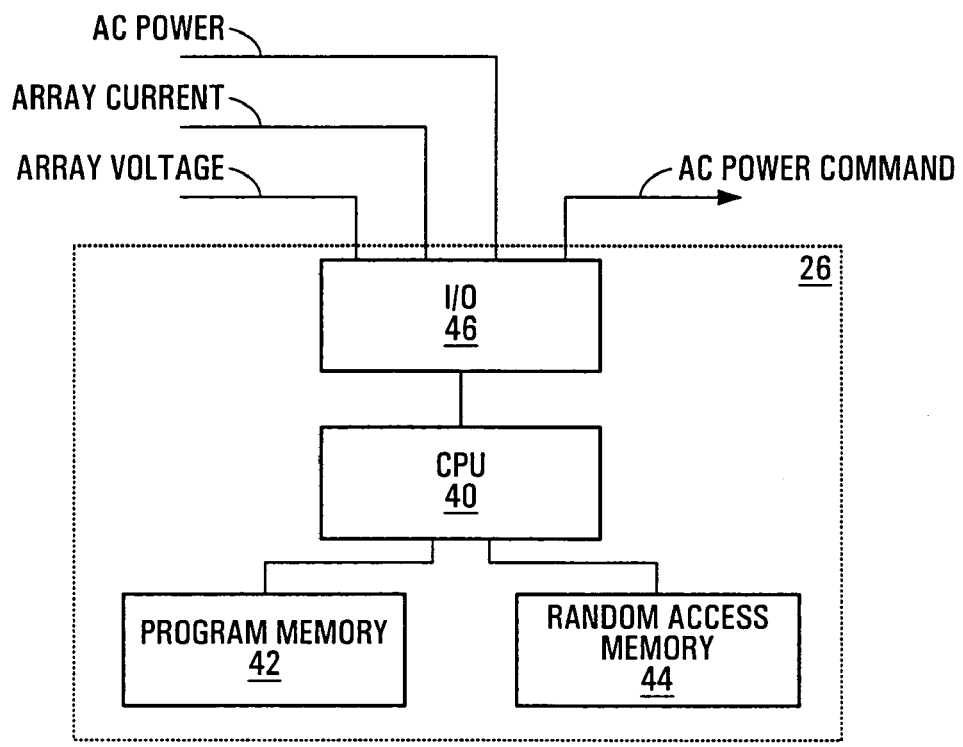
FIG. 4 is a block diagram of a processor circuit of the load interface shown in FIG. 3.

Referring to FIG. 4, the processor 26 may include a microchip PIC 16F876A, for example, having a CPU 40, a program memory 42, random access memory 44 and an I/O interface 46. Signal lines 48, 49 and 51 operable to receive a signal from the DC current sensor 28, a signal from the DC voltage sensor 30 and a signal from the AC power sensor 32, respectively, are connected to the I/O interface. The I/O interface 46 also provides an AC power command signal to the DC to AC inverter 24, specifying a desired AC power to be supplied to the AC power grid 16. In general, in response to the DC current signal, the DC voltage signal and the AC power signal, an appropriate AC load power command signal is produced by the processor 26 to control the DC to AC inverter 24 such that maximum power is extracted from the array 18.

The processor 26 may be the same processor used to control switching of transistors in the DC to DC converter 22 and the DC to AC inverter 24, for example, and programs for controlling the DC to DC converter 22 and DC to AC inverter 24 may be stored in the program memory 42. In addition, the program memory 42 may be programmed with codes for directing the processor 26 to carry out methods according to various embodiments and aspects of the embodiment of the invention as described herein. In particular, these codes may cause the processor 26 to implement control routines described by way of the flowcharts, tables and graphs shown in FIGS. 5–11B to effect the functionality of the methods according to this embodiment of the invention.

Figure 5:
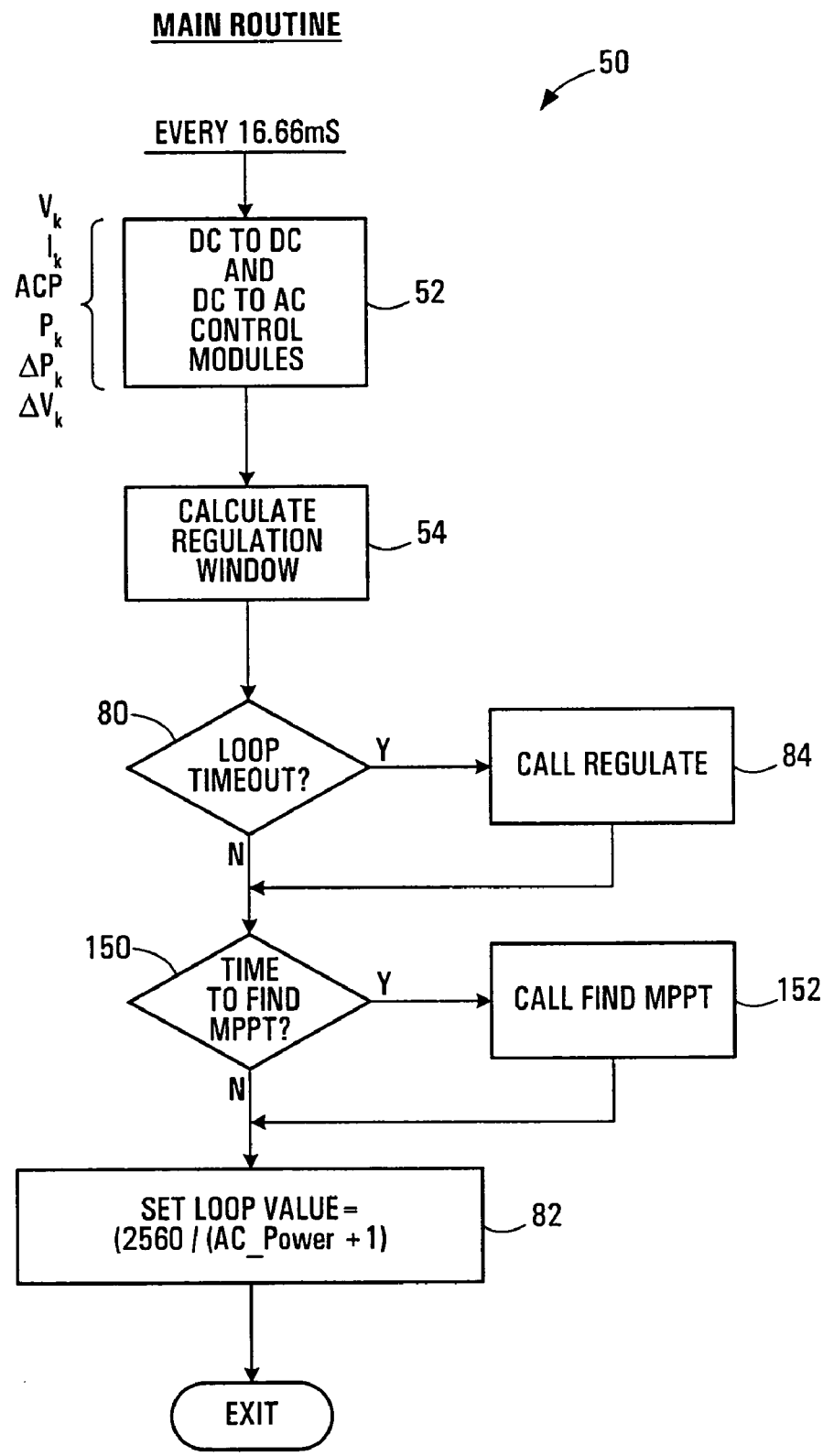
FIG. 5 is a flow chart of a main routine executed by the processor circuit shown in FIG. 4.

Referring to FIG. 5, a main routine according to the first embodiment of the invention is shown generally at 50. This routine is run every 16.66 milliseconds. This 16.66 millisecond period is chosen because it is the period of the line frequency (60 hertz) of the AC power supplied to the grid. Thus, the main routine is invoked once for every cycle of the AC waveform provided to the AC power grid.

The main routine begins by causing the processor 26 to execute any DC to DC and DC to AC control modules, as shown at 52. As part of these modules, a measurement of the photovoltaic array voltage Vk is taken, a measurement of the current Ik produced by the photovoltaic array is taken and an AC power measurement ACP is taken. Also within these modules, the array voltage Vk and array current Ik measurement values are multiplied together to produce a power value Pk associated with the current pass through the routine. A power value calculated from one or more previous passes through the routine may be stored to enable a change in power value to be calculated within these modules. A representation of a change in power dP from one pass through the routine to the next is required in subsequent routines described herein. Similarly, a change in voltage dV from one pass to next is calculated for use in subsequent routines.

After completing the DC to DC and DC to AC control modules 52, block 54 directs the processor 26 to a "calculate regulation window" routine.

Figure 6:
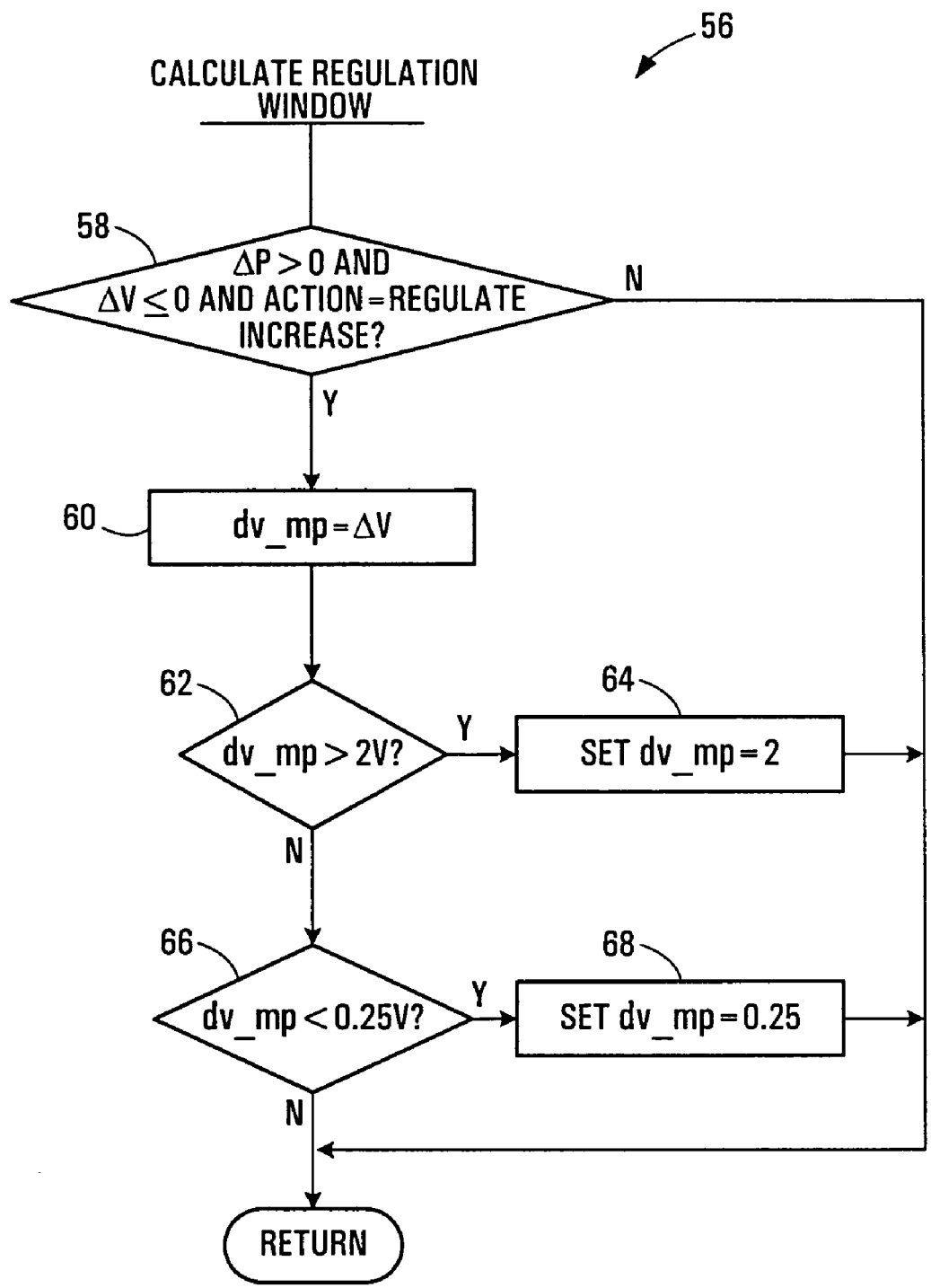
FIG. 6 is a flow chart of a regulation window calculation subroutine called by the main routine shown in FIG. 5.

Referring to FIG. 6, the "calculate regulation window" routine is shown at 56 and begins with a first block 58 that causes the processor 26 to determine whether the change in power since the last pass is greater than zero and whether the change in voltage since the last pass is less than or equal to zero and whether or not a state variable labeled "action" is equal to a regulate increase state. (The way in which the action state variable is set will be described below).

Assuming the above conditions are met, block 60 directs the processor 26 to set a variable referred to as dv_mp equal to the change in voltage since the last increase in power caused by a "more power" routine described below, and is thus dependent upon the trend in measured array voltage. Block 62 then directs the processor 26 to determine whether this dv_mp value is greater than a pre-set value, in this instance 2.0 volts, and if so, block 64 directs the processor 26 to set the dv_mp value to 2.0. Block 66 directs the processor 26 to determine whether the dv_mp value is less than another predetermined value, in this case 0.25 volts, and if so, block 68 directs the processor 26 to set the dv_mp value equal to 0.25 volts. In effect, blocks 62 through 68 cause the processor 26 to set the dv_mp value to the average change in voltage over the last two power increases between a maximum value of 2.0, and a minimum value of 0.25.

Figure 7:
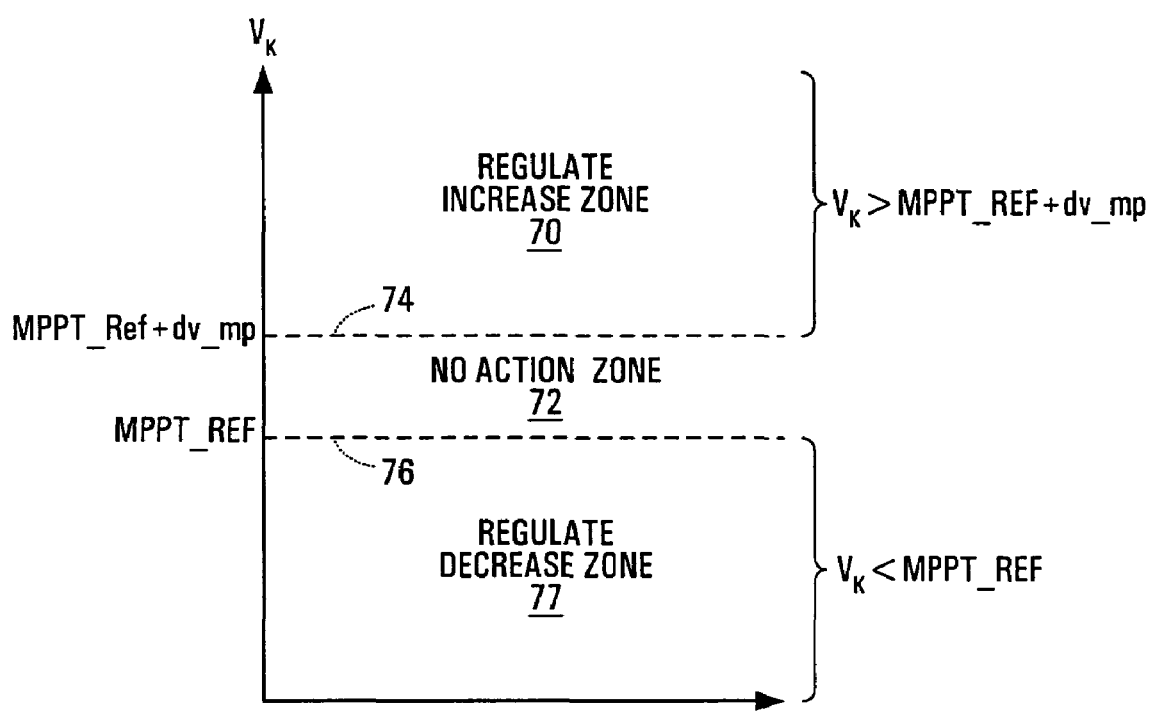
FIG. 7 is a schematic representation of regulation zones associated with the photovoltaic array shown in FIG. 2.

Referring to FIG. 7, the dv_mp value is used to define a boundary between a regulate increase zone shown generally at 70 and a no-action zone shown generally at 72 among the possible range of array voltages $V_k$. The effect of changes in dv_mp are to adjust up or down, the boundary between the regulate increase zone 70 and the no-regulate zone 72 indicated by line 74. The no-action zone 72 is defined between this boundary 74 and a line 76 determined by a maximum power point tracking reference voltage (MPPT_ref) which is initially set at about 84% of the open circuit voltage of the array in this embodiment. Below this line 76 a regulate decrease zone 77 is established. The regulate increase zone 70 acts as a first range of voltages relative to a reference voltage corresponding to a maximum power point of the array, and includes voltages greater than the reference voltage (MPPT_ref). The regulate decrease zone includes a range of voltages less than the reference voltage (MPPT_ref). A first range of voltages for which criteria for changing the amount of power drawn from the array are considered to be met thus includes voltages in the regulate increase and regulate decrease zones 70 and 77 and excludes a range of voltages within a limit of the reference voltage, i.e., the no-action zone 72. Thus the criteria for changing the amount of power drawn from the energy converter are whether or not the array voltage is within the regulate increase zone 70 or the regulate decrease zone 77.

When the change in voltage on successive passes through the routine shown in FIG. 6 is low, the no-action zone 72 is relatively small and the regulate increase zone 70 is relatively large. Conversely, when the dv_mp value is large, the no-action zone 72 is large and the regulate increase zone 70 is relatively small. The 0.25 and 2.0 lower and upper limits effectively bound the first range of voltages for which the criteria for changing the amount of power drawn from the array are met within minimum and maximum limits.

Referring back to FIG. 6, effectively the calculate regulation window value routine sets the dv_mp value to establish the boundary 74 shown in FIG. 7 between the regulate increase zone 70 and the no-action zone 72 thus defining the width of the no-action zone. The establishment of the variable-sized no-action zone 72 eliminates dithering and allows the processor circuit to change its sensitivity to changes in voltage, depending upon the trend in voltage increases and decreases.

Referring back to FIG. 5, after calculating the regulation window, block 80 directs the processor 26 to determine whether a loop time out value has occurred. Later in the main routine 50, the loop value is set as shown at block 82 as will be described below. An initial loop value of 50 milliseconds, for example, may be set such that for example, on every third pass through the main routine shown at 50, the loop time out value will expire, and as shown at block 84, control of the processor 26 will pass to a regulate routine.

Figure 8:
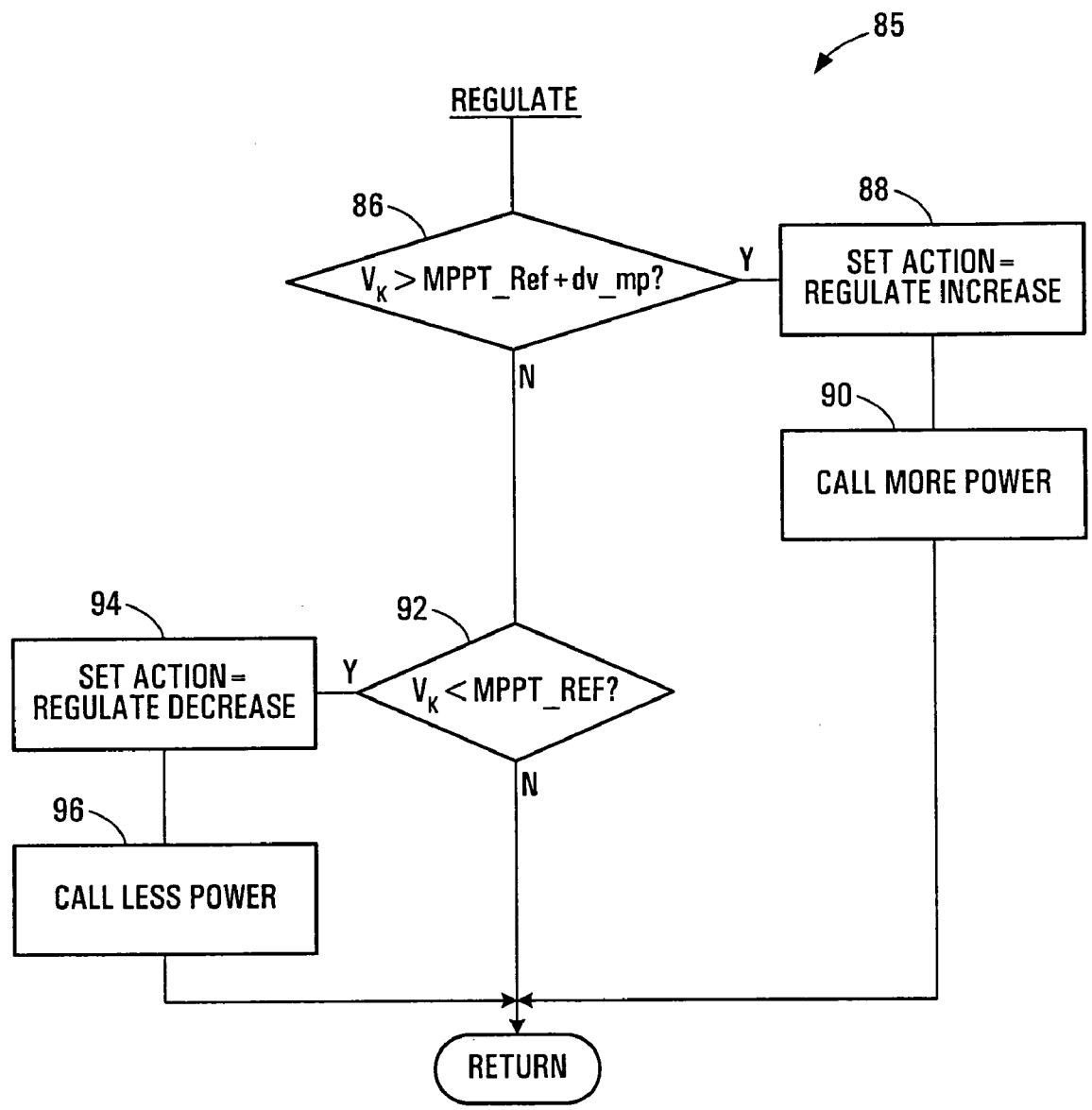
FIG. 8 is a flow chart of a regulate routine called by the main routine shown in FIG. 5.

Referring to FIG. 8, the regulate routine is shown in greater detail at 85. The regulate routine begins with a first block 86 that directs the processor 26 to determine whether the present voltage of the array is greater than the sum of the MPPT-ref voltage and the dv_mp value. In other words, this block determines whether or not the array voltage $V_k$ is in the regulate increase zone 70 shown in FIG. 7. If so, block 88 directs the processor 26 to set the action state variable to "regulate increase" and then a "more power" routine is called as shown at 90 to increase the power drawn from the array. If, however, at block 86, the array voltage $V_k$ is not in the regulate increase zone 70, block 92 directs the processor 26 to determine whether the array voltage $V_k$ is in the regulate decrease zone 77. If so, block 94 directs the processor 26 to set the action state value to "regulate decrease" and block 96 directs the processor 26 to call a "less power" routine to reduce the power demanded from the array. If the array voltage $V_k$ is in neither the regulate increase zone 70 or the regulate decrease zone 77 as determined by blocks 86 and 92, the regulate routine 85 is ended and the processor 26 is returned to the remaining portion of FIG. 5 (block 150). Referring to FIG. 7, when the voltage of the array is in the no-action zone 72, no action is taken to increase or decrease the power demanded from the array.

Figures 9A, 9B:
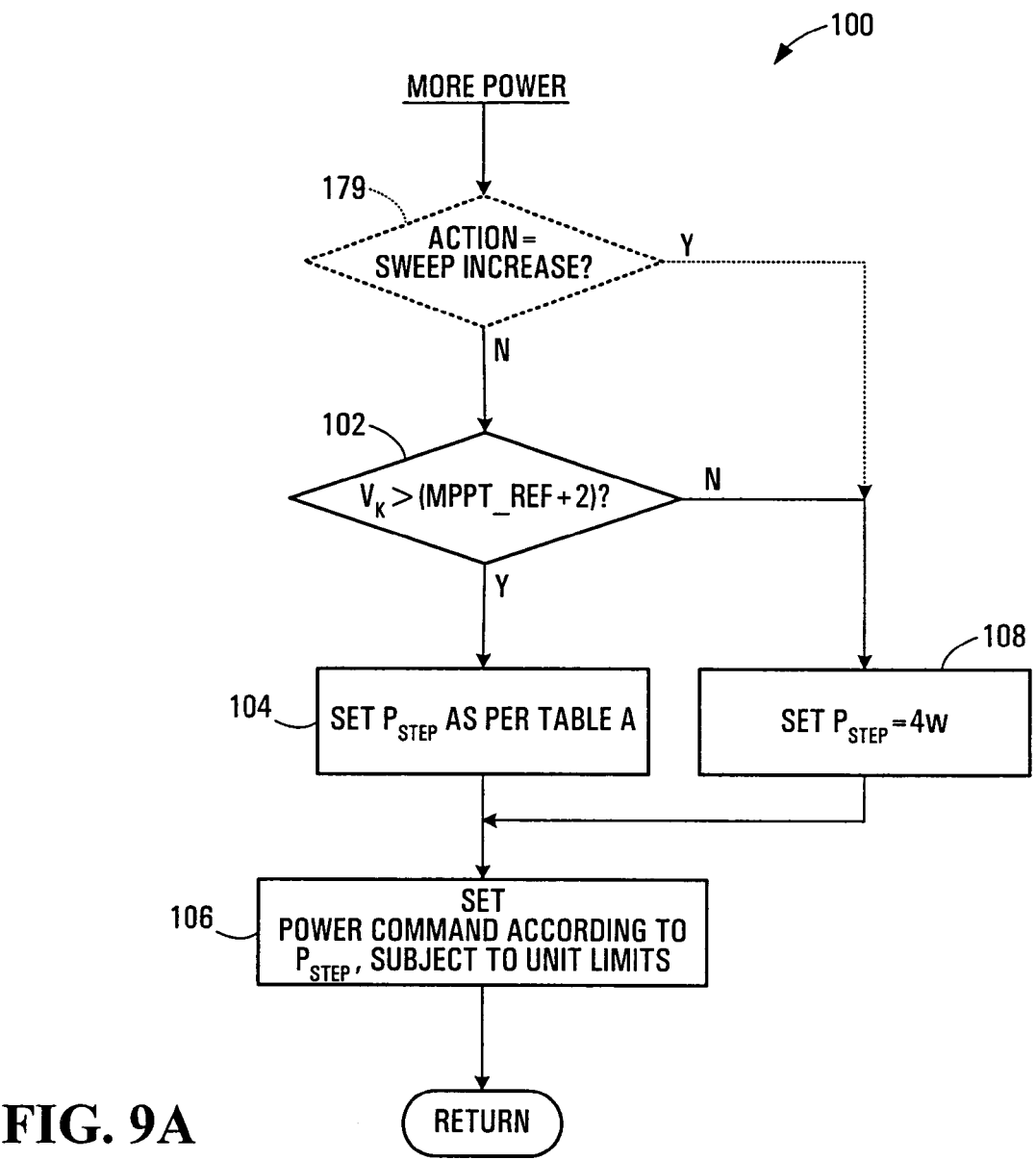
FIG. 9A is a flow chart of a more power routine called by the regulate routine shown in FIG. 8.
FIG. 9B is a table for determining a change in power according to a current AC power being provided by the system shown in FIG. 3.

Referring back to FIG. 8, when the processor 26 calls the more power routine as shown at block 90, the more power routine shown at 100 in FIG. 9A is executed. Generally, the more power routine 100 begins with a first block 102 that causes the processor 26 to determine whether or not the array voltage $V_k$ is greater than the sum of the $MPPT_{13}$ ref voltage and a predefined value, for example, 2.0 volts. When the array voltage $V_k$ is more than 2.0 volts above the $MPPT_{13}$ ref voltage, block 104 directs the processor 26 to set a power step variable according to Table A shown in FIG. 9B. Use of this table involves using the presently measured AC load power value as an index to the table to determine which of a plurality of power ranges, the present AC load power value falls into. If the AC load power value is between zero and 40 volts, for example, the power step value is set to 4 watts. If the AC load power is between 800 watts and the maximum power available, the power step value is set to 24 watts, for example. In general, progressively larger AC load power ranges are associated with progressively larger power step values.

Once the power step value is known, referring back to FIG. 9A, block 106 causes the power command signal to be set according to the power step value to increase the power demanded from the array by the power step value, subject to unit limits. Referring back to FIG. 9B, it will appreciated that as the AC load power increases, the power step value increases and thus the change in power in the power command is larger, at larger AC load power values.

Referring back to FIG. 9A, if the array voltage $V_k$ is not greater than (MPPT_ref+2.0 ), block 108 sets the power step value to a fixed value, in this case 4 watts, and block 106 causes the power command to be increased to request 4 more watts from the array. In effect, the more power routine 100 provides for larger increases in power demanded from the array when the array voltage $V_k$ is relatively high and the supplied AC load power is high. Similarly, when the array voltage $V_k$ is closer to the MPPT_ref value, a smaller, fixed change in power is used, since it is assumed that the array is operating closer to the maximum power point. The effect of varying the change in power according to the present AC power being supplied to the load and subject to the array voltage meeting the indicated condition, provides for wide increases in power at higher AC load power levels, thus allowing the maximum available power from the array to be supplied to the AC grid quicker, than if a fixed, relatively small step size such as 4 watts were used. This allows the system to achieve its optimal operating point very quickly, allowing it to change its output from 200 W to 2000 W in about four seconds, for example.

Referring back to FIG. 8, when the array voltage $V_k$ is less than the MPPT_ref value, the less power routine is called at block 96.

Figure 10A:
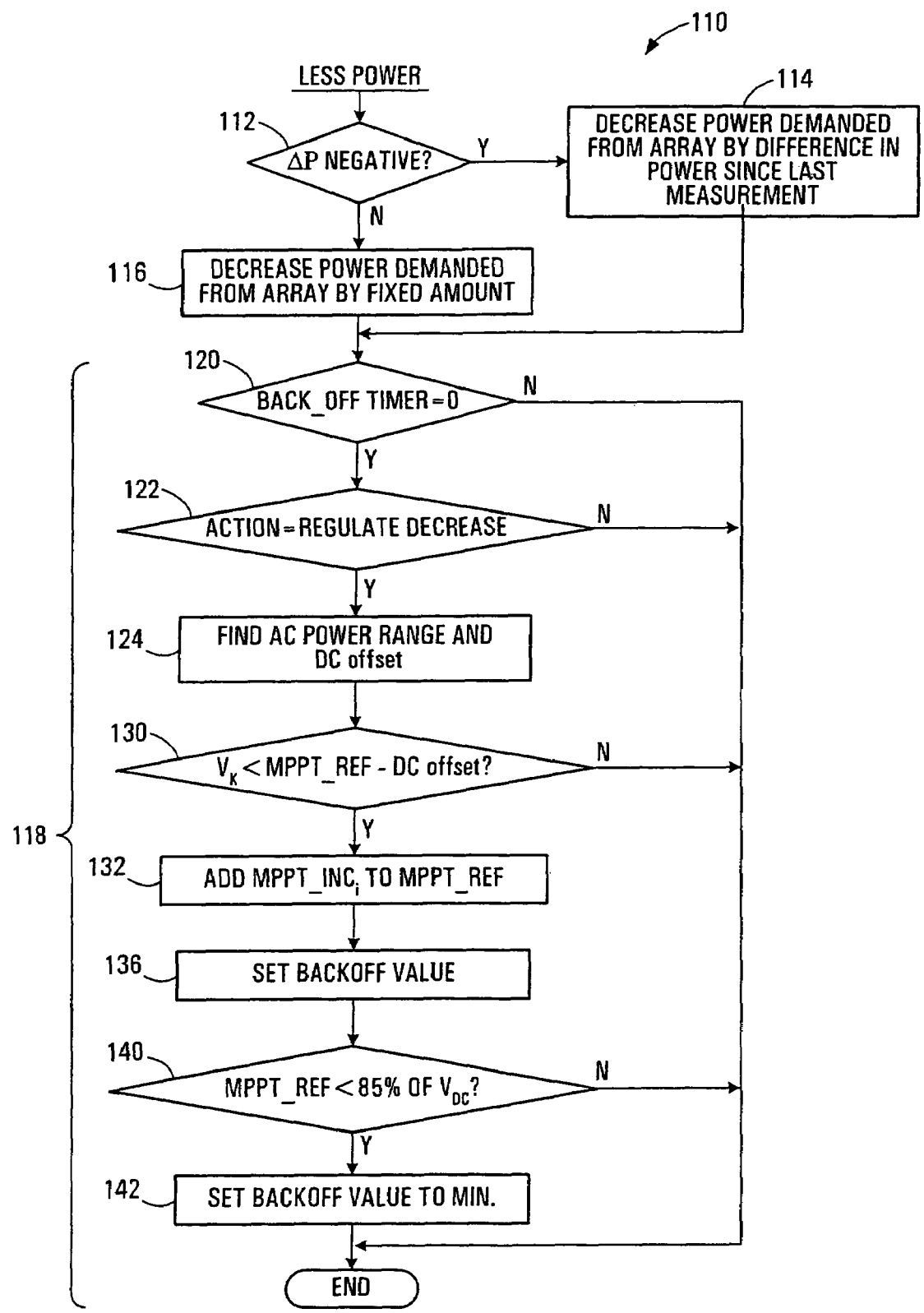
FIG. 10A is a flow chart of a less power routine called by the regulate routine shown in FIG. 8.
Figure 10B:
FIG. 10B is a Table relating present AC power to a DC offset value, an MPPT increase value and a back-off value used by the second portion of the less power routine shown in FIG. 10A.

The less power routine is shown in FIG. 10A, with further reference to FIG. 10B. A first part of the less power routine is shown in FIG. 10A at 110 and begins with a first block 112 that causes the processor 26 to determine whether the change in power since the last pass through the main routine shown in FIG. 5 is negative. If so, block 114 directs the processor 26 to issue a power command to the DC to AC inverter 24 to cause a decrease in the power demanded from the array by an amount equal to the difference in power demanded since the last pass through the main routine. On the other hand, if the change in power is not negative, i.e., zero or positive, block 116 directs the processor 26 to issue a power command that decreases the power demanded from the array by a fixed amount such as 4 watts, for example. In effect, block 114 decreases the power demanded from the array by an amount depending on the change of power, and block 116 decreases the power demanded from the array by a fixed amount.

After either block 114 or 116 has been executed, a second part of the less power routine as shown at 118 is executed. This second part 118 of the less power routine includes a first block 120 that causes the processor 26 to determine whether or not a backoff timer has timed out. If not, the less power routine is ended. If so, block 122 directs the processor 26 to determine whether or not the action state variable has been set to "regulate decrease". If not, then the less power routine is ended. If so, however, block 124 directs the processor 26 to use Table B of FIG. 10B to determine a DC offset value shown in column 126 associated with an AC load power range shown in column 128 in which the current AC load power falls. Then, block 130 directs the processor 26 to determine whether or not the present array voltage $V_k$ is less than the current $MPPT_{13}$ ref value less the DC offset value found in block 124 and if not, the less power routine is ended. If the array voltage $V_k$ is less than the $MPPT_{13}$ ref less the DC offset, i.e., it is within a second range, block 132 increases the $MPPT_{13}$ ref value by the amount indicated in Column 134 of Table B in FIG. 10B associated with the power range in which the current AC load power falls. Thus, the second range is dependent upon the amount of power being supplied to the load. The second range is relatively small when a relatively large amount of power is supplied to the load and is relatively large when a relatively small amount of power is supplied to the load. Any increases in MPPT$_{13}$ ref may be limited to ensure MPPT$_{13}$ ref is no greater than the open circuit voltage of the array less some guard value such as 3 volts, for example. (The open circuit voltage of the array may be measured periodically to allow for changes in the open circuit voltage to be monitored.)

Similarly, block 136 directs the processor 26 to set a back-off timer value selected from column 138 in Table B of FIG. 10B associated with the AC power range in which the current AC power falls.

Referring back to FIG. 10A, block 140 then directs the processor 26 to determine whether or not the current adjusted MPPT_ref value is less than 85% of the open circuit voltage of the array. (The open circuit voltage is previously known from initial measurements). If the MPPT_ref value is not less than 85% of the open circuit voltage of the array, the less power routine is ended, leaving the back-off value at that which was selected from Table B in FIG. 10C. Otherwise, if the MPPT_ref value is less than 85% of the open circuit voltage of the array, block 142 directs the processor circuit to set the back-off value to a minimum value which, in this embodiment may be 240, for example. The effect of the second part of the less power subroutine is to prevent constantly changing conditions from excessively adjusting the MPPT_ref value too often. Effectively, the MPPT_ref value is increased only when the regulation routine described above is not able to keep the array voltage $V_k$ above a threshold value.

Referring back to FIG. 5, after the call regulate routine has been executed, or if the loop timeout value has not yet been reached, the processor 26 is directed to block 150 of FIG. 5.

Block 150 directs the processor 26 to determine whether it is time to find a new MPPT_ref value. To do this, a timer may be preprogrammed with an appropriate value to cause the timer to time out every 10 seconds, for example. Thus, every 10 seconds, it is time to find a new MPPT_ref value. Provisions may be included for ensuring the source power is above some minimum value such as 20 Watts, for example, before enabling the 10 second timer. Initially, the MPPT_ref value is set to about 84% of the open circuit voltage of the array. This is typically about 10% higher than the expected MMPT_ref value for most photovoltaic arrays, but it allows the circuit to more readily adapt to different arrays. This also eliminates the need to sweep the array.

Figure 11A:
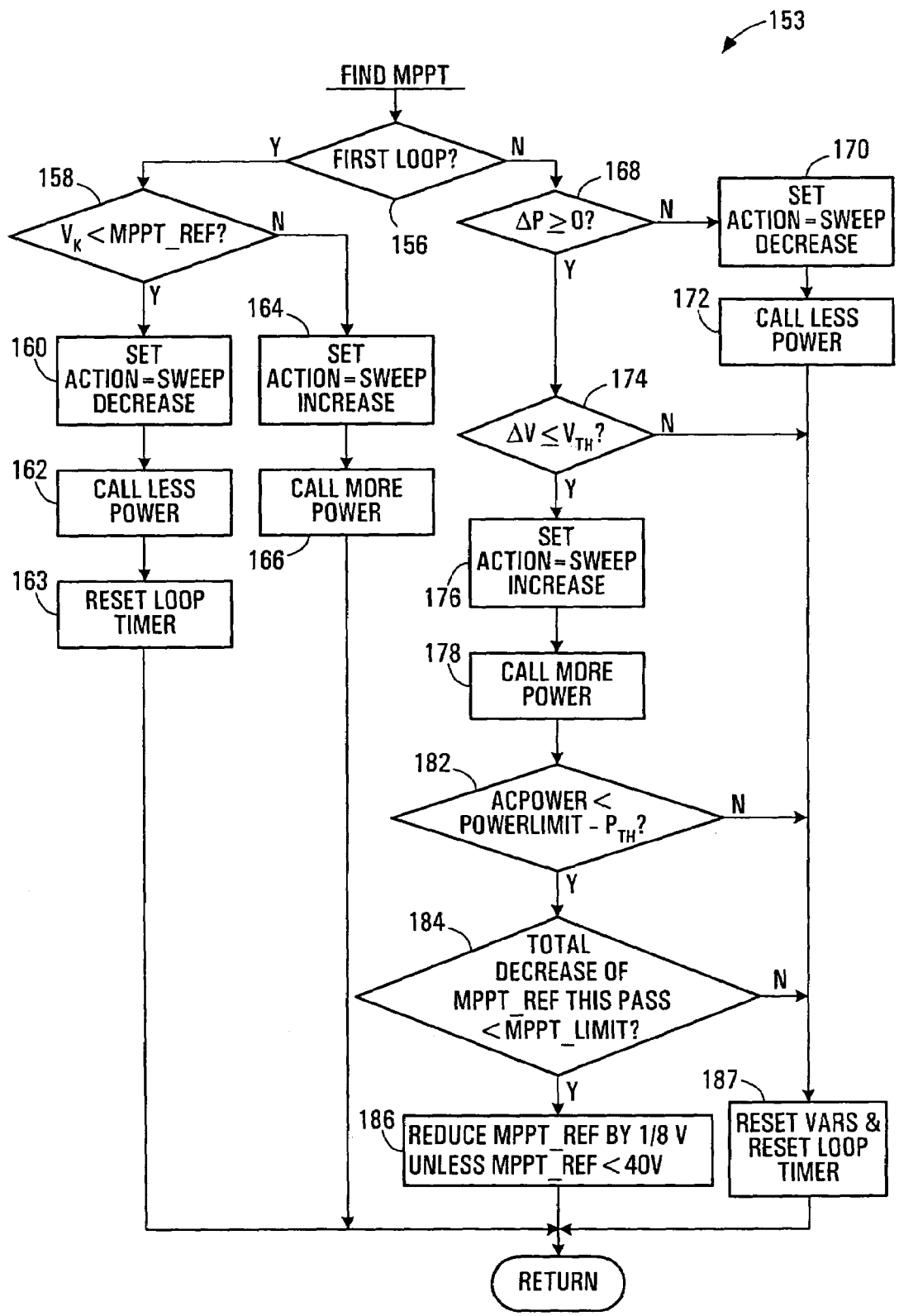
FIG. 11A is a flow chart of a find MPPT subroutine called by the main routine shown in FIG. 5.

When the timer times out, block 152 directs the processor circuit to call a find MPPT subroutine as shown at 153 in FIG. 11A, with reference to FIG. 11B. Referring to FIG. 11A, the find MPPT routine 153 begins with a first block 156 that directs the processor 26 to determine whether or not this is the first pass through the routine. Detection of whether or not the present pass through the routine is the first pass may be achieved by detecting whether or not a first pass flag (not shown) has been set and if not set, setting it and directing the processor to block 158. If the first pass flag has been set, then the present pass through the MPPT routine is not the first pass and the processor is directed to block 168. When the present pass through the routine is the first pass, block 158 directs the processor 26 to determine whether the array voltage $V_k$ is less than the MPPT_ref voltage, i.e., whether the array voltage is within the regulate decrease zone shown in FIG. 7. If so, block 160 directs the processor 26 to set the action state variable to "sweep decrease" and then block 162 directs the processor 26 to call the less power routine described in FIG. 10A. Block 163 then directs the processor 26 to reset the MPPT loop timeout value so that another ten seconds will pass before the find MPPT routine is run again. The routine is ended after block 163.

If at block 158 the array voltage $V_k$ is not less than the MPPT$_{13}$ ref value, block 164 directs the processor circuit to set the action state variable to "sweep increase" and block 166 directs the processor 26 to call the more power routine shown in FIG. 9A. Referring back to FIG. 11A, after the more power routine has been called, the MPPT routine is ended.

Referring back to FIG. 11A, if at block 156 it is determined that the current pass is not the first pass through this routine, the processor 26 is directed to block 168 which causes it to determine whether or not the change in power since the last pass through this routine, is greater than or equal to zero. If not, block 170 directs the processor 26 to set the action state variable to "sweep decrease" and block 172 directs the processor 26 to call the less power routine shown in FIG. 10A. As described above, the less power routine includes blocks that employ table B in FIG. 10B to increase MPPT_ref. The effect of the table is to use the current AC load power to determine an array voltage limit below which no increase in MPPT_ref occurs and above which a specific increase dependent upon current AC power is effected. This also makes the circuit sensitive to trends in power, rather than to instantaneous power.

Referring back to FIG. 11A, if at block 168, the change in power is less than zero, the processor 26 is directed to block 174 which causes it to determine whether or not the change in voltage since the last pass through this routine is less than or equal to a threshold value of, in this embodiment, 2 volts for example. Block 176 then directs the processor 26 to set the action state variable to "sweep increase" and block 178 directs the processor 26 to call the more power routine shown in FIG. 9A.

Referring to FIG. 9A, the more power routine includes a block 179 shown in broken outline which determines whether or not the action state variable is equal to "sweep increase" as set by block 176 in FIG. 11A. If so, the processor 26 is directed to block 108 of FIG. 9A wherein the power step value is set to 4 watts such that block 106 causes a power command to be issued to request 4 more watts from the system.

Referring back to FIG. 11A, block 182 directs the processor 26 to determine whether or not the present power being provided to the AC grid by the system is within pre-specified limits. If not, the find MPPT routine is ended. If so, block 184 directs the processor 26 to determine whether a total decrease of the MPPT_ref value as of this pass through the routine is less than an MPPT limit value established according to Table C in FIG. 11B in response to the present AC power provided by the system. If so, block 186 is permitted to reduce the MPPT_ref value by ⅛$^{th}$ volts unless the MPPT_ref value is less than 40 volts, which in this case is a minimum voltage bound. The ⅛ volt reduction is equivalent to the resolution of the voltage sensor 30. The bounds checking at blocks 184 and 186 avoids excessive changes in MPPT_ref and instead makes the circuit sensitive to power trends rather than instantaneous power values. In general, the amount by which MPPT_ref is decreased is dependent upon the amount of power supplied to the load and is relatively large when the power supplied to the load is small and is relatively small when the power supplied to the load is large. After block 186, the find MPPT routine is ended but the MPPT loop timer is not reset, therefore on the next pass through the main routine shown in FIG. 5, it will still be time to find MPPT and another pass through the MPPT routine will be initiated.

After the call less power routine is invoked at block 172, or the change in voltage is not less than or equal to Vth at block 174, or the AC Power is not less than the Powerlimit-Pth at block 182 or the total decrease of MPPT_ref is not less than MPPT_limit at block 184, block 187 directs the processor 26 to reset variables and reset the MPPT loop timer to cause the processor to wait another ten seconds before executing the find MPPT routine again.

The effect of the MPPT routine is—while the change in power is greater than or equal to zero and while the change in voltage is less than or equal to the threshold voltage—to reduce the MPPT_ref value by $\frac{1}{8}^{th}$ volts on each pass through the routine until a maximum reduction amount is achieved, the maximum reduction amount being determined by the present AC load power being provided to the AC grid. When the present AC load power is low, the MPPT limit is high, whereas when the present AC power is high, the MPPT limit is low. The MPPT routine thus acts as a modified perturb and observe routine that decreases MPPT_ref while the less power routine serves to increase MPPT_ref. Both of these routines adjust the MPPT_ref value on the basis of the present amount of power being supplied to the load. Consequently, the apparatus tracks the maximum power point of the energy converter more accurately. Since the MPPT_ref value is dependent upon the present power being supplied to the load and since the MPPT_ref value establishes the boundaries shown in FIG. 7. Effectively the criteria to be met by the array voltage to cause a change in the amount of power drawn from the array are dependent upon the present power being supplied to the load.

After completion of the MPPT routine shown in FIG. 11A, the processor 26 is directed back to block 82 of FIG. 5. Block 82 directs the processor 26 to set the loop value for the loop timeout test at block 80 as a function of the power supplied to the load. In this embodiment, setting of the loop value is done according to the formula (2560/($AC_{13}$ power+ 1) subject to upper and lower bounds which in this embodiment are 60 and 3 respectively. When the dynamic loop value is 60 for example, the loop time out and hence the regulate routine will be run every second and when the dynamic loop value is 3, for example, the loop time out and hence the regulate routine will occur approximately every 50 milliseconds, or 20 times per second. The loop value is dependent upon the AC power and as the AC power increases, the loop value decreases causing the loop time out to occur more frequently. Similarly, as AC power decreases, loop time out occurs less frequently. When the amount of power supplied to the AC load is low, capacitors in the DC to DC converter and in the DC to AC inverter are the source of power for any increases in power and thus any increase in load measured at the array will be delayed. Consequently, it is desirable to cause the loop timeout to occur more frequently so that the processor can react more quickly to increases in the AC load. When operating at high power levels, the capacitors are being drained more quickly and thus, changes in load are more readily seen by the processor and therefore more frequent loop timeouts serve no useful purpose. Thus, at high power levels the loop timeout value can be high resulting in less frequent monitoring by the processor circuit. The specific formula for calculating the loop value is appropriate for the Suntie® inverter and it will be appreciated that in other systems employing different capacitors, the formula may be different with the general goal of enabling the processor circuit to respond less frequently at low AC power levels and more frequently at high power levels.

Effectively the method and apparatus described herein cause power to be extracted from an energy converter in a manner in which maximum power is drawn from the energy converter. This is achieved by operating the energy converter such that current is drawn at a level that maintains the supply voltage of the energy converter as close as possible to a maximum power point tracking voltage of the energy converter. Since this maximum power point tracking voltage changes with operating conditions of the energy converter, one part of the control method described herein updates this maximum power point tracking voltage and another part adjusts the amount of power drawn from the energy converter to cause the energy converter voltage to track as close as possible to the maximum power point tracking voltage.

The methods and apparatus described herein effectively load the energy converter until the power extracted from the energy converter starts decreasing and the voltage of the energy converter is also decreasing. This condition signifies that the energy converter is operating past its peak power point. The energy converter voltage at this point is considered a reference voltage (MPPT_ref) and subsequently, the level of current drawn from the energy converter is generally maintained such that the voltage of the energy converter is held as close as possible to this reference value, at least until it is updated.

In general where switching power supplies are used in conjunction with an energy converter, such devices have little tolerance for being on the negative side of the $MPPT_{13}$ ref point and are subject to collapse. Therefore the control methods and apparatus described herein attempt to keep the energy converter voltage on the positive side of the $MPPT_{13}$ ref point. Furthermore, in the specific application described herein DC to DC switching power supplies driving DC to AC inverters generally do not act in a linear manner to changes in power imposed by the DC to AC inverter, especially due to power storage in each device. Thus, the methods and apparatus described herein attempt to observe trends in power and voltages to ensure more reliable operation and set changes in the amount of power drawn from the energy converter on the basis of power supplied to the load rather than power drawn from the energy converter to enable these control methods to be used in DC to AC energy conversion applications.

While specific embodiments of the invention have been described and illustrated, such embodiments should be considered illustrative of the invention only and not as limiting the invention as construed in accordance with the accompanying claims.

What is claimed is:

1. An apparatus for controlling an energy transfer device operable to draw electrical power from an energy converter operable to convert energy from a physical source into electrical energy, and supply said electrical energy to a load, the apparatus comprising:

a load power sensor operable to measure power supplied to the load by the energy transfer device;

a voltage sensor operable to measure a supply voltage of the energy converter; and a processor, in communication with said voltage sensor, said load power sensor and the energy transfer device, said processor being configured to cause the energy transfer device to change the amount of power drawn from the energy converter when the supply voltage of the energy converter meets a criterion, said criterion and the change in the amount of power drawn from the energy converter being dependent upon a present amount of power being supplied to the load.

2. The apparatus of claim 1 wherein said processor is configured to decrease said power drawn from the energy converter by an amount corresponding to a change in said power drawn from the energy converter in a time interval.

3. The apparatus of claim 1 wherein said processor is configured to increase said power drawn from the energy converter by an amount associated with a range of power supplied to the load.

4. The apparatus of claim 1 wherein said processor is configured to deem said supply voltage satisfies said criterion when said supply voltage is within a first range of voltages relative to a reference voltage.

5. The apparatus of claim 4 wherein said reference voltage corresponds to a maximum power point of the energy converter.

6. The apparatus of claim 4 wherein said first range includes voltages greater than said reference voltage.

7. The apparatus of claim 4 wherein said first range includes voltages less than said reference voltage.

8. The apparatus of claim 4 wherein said first range includes voltages less than said reference voltage and voltages greater than said reference voltage.

9. The apparatus of claim 4 wherein said first range excludes a range of voltages within a limit of said reference voltage.

10. The apparatus of claim 4 wherein said first range is dependent upon a trend in measured values of said supply voltage.

11. The apparatus of claim 10 wherein said first range is dependent upon a change in said supply voltage occurring after an increase in said power drawn from the energy converter.

12. The apparatus of claim 11 wherein said first range is bounded between minimum and maximum limits.

13. The apparatus of claim 1 wherein said processor is configured to periodically measure said supply voltage and change said supply power drawn from the energy converter accordingly.

14. The apparatus of claim 13 wherein said processor is configured to define a period for measuring said supply voltage.

15. The apparatus of claim 14 wherein said processor is configured to define said period as a function of said power supplied to the load.

16. The apparatus of claim 15 wherein said processor is configured to increase said period when said power supplied to the load is relatively low and decrease said period when said power supplied to the load is relatively high.

17. The apparatus of claim 4 wherein said processor is configured to adjust said reference voltage periodically.

18. The apparatus of claim 4 wherein said processor is configured to increase said reference voltage when the change in said power drawn from the energy converter results in a change in said supply voltage within a second range.

19. The apparatus of claim 18 wherein said second range is dependent upon the present amount supplied to the load.

20. The apparatus of claim 19 wherein said second range is relatively small when the present amount of power supplied to the load is relatively large and wherein said second range is relatively large when the present amount of power supplied to the load is relatively small.

21. The apparatus of claim 18 wherein said processor is configured to decrease said reference voltage by an amount dependent upon the amount of power supplied to the load.

22. The apparatus of claim 21 wherein said processor is configured to decrease said reference voltage by a relatively large amount when the present amount of power supplied to the load is relatively low and to decrease said reference voltage by a relatively small amount when the present amount of power supplied to the load is relatively high.

23. The apparatus of claim 1 wherein said processor includes an output operable to provide a power command signal to said energy transfer device, and wherein said processor is configured to produce said power command signal to represent said change in power to be drawn from the energy converter.

24. A system comprising the apparatus of claim 1 and further comprising said energy transfer device.

25. The system of claim 24 wherein said energy transfer device includes a DC to DC converter connected between said energy converter and said load.

26. The system of claim 25 wherein said energy transfer device includes a DC to AC inverter connected between said DC to DC converter and said load.

27. The system of claim 24 further comprising said load.

28. The system of claim 27 wherein said load includes an AC power grid.

29. The system of claim 24 wherein said processor includes an output operable to provide a power command signal to said energy transfer device, and wherein said processor is configured to produce said power command signal to represent said change in power to be drawn from the energy converter.

30. An apparatus for controlling an energy transfer device operable to draw electrical power from an energy converter operable to convert energy from a physical source into electrical energy, and supply said electrical energy to a load, the apparatus comprising:

means for measuring power supplied to the load by the energy transfer device;

means for measuring a supply voltage of the energy converter; and means, in communication with said means for measuring power, said means for measuring voltage and the energy transfer device, for changing the amount of power drawn from the energy converter by the energy transfer device when a supply voltage of the energy converter meets a criterion, said criterion and a change in the amount of power drawn from the energy converter being dependent upon a present amount of power being supplied to the load.

* * * * *